J. P. OFFERMAN.
SUPPORTING MECHANISM FOR SCRAPING BLADES.
APPLICATION FILED FEB. 3, 1916.

1,204,306.

Patented Nov. 7, 1916.

Inventor
Joseph P. Offerman
By Ensin & Wheeler
Attorneys.

UNITED STATES PATENT OFFICE.

JOSEPH P. OFFERMAN, OF BEAVER DAM, WISCONSIN, ASSIGNOR TO BEAVER DAM MANUFACTURING CO., OF BEAVER DAM, WISCONSIN, A CORPORATION OF WISCONSIN.

SUPPORTING MECHANISM FOR SCRAPING-BLADES.

1,204,306.     Specification of Letters Patent.     Patented Nov. 7, 1916.

Application filed February 3, 1916. Serial No. 75,943.

*To all whom it may concern:*

Be it known that I, JOSEPH P. OFFERMAN, a citizen of the United States, residing at the city of Beaver Dam, county of Dodge, and State of Wisconsin, have invented new and useful Improvements in Supporting Mechanisms for Scraping-Blades, of which the following is a specification.

My invention relates to improvements in devices for attaching scrapers to each side of two converging disks of a so-called disk seeder in such a manner that the tension on two outside disk scrapers may be yieldingly increased or diminished by turning a nut forwardly or backwardly upon a single bolt, and whereby the tension on two inside scrapers may also be yieldingly increased or diminished by turning a nut forwardly or backwardly upon another bolt.

My invention is further explained by reference to the accompanying drawings, in which—

Figure 1:
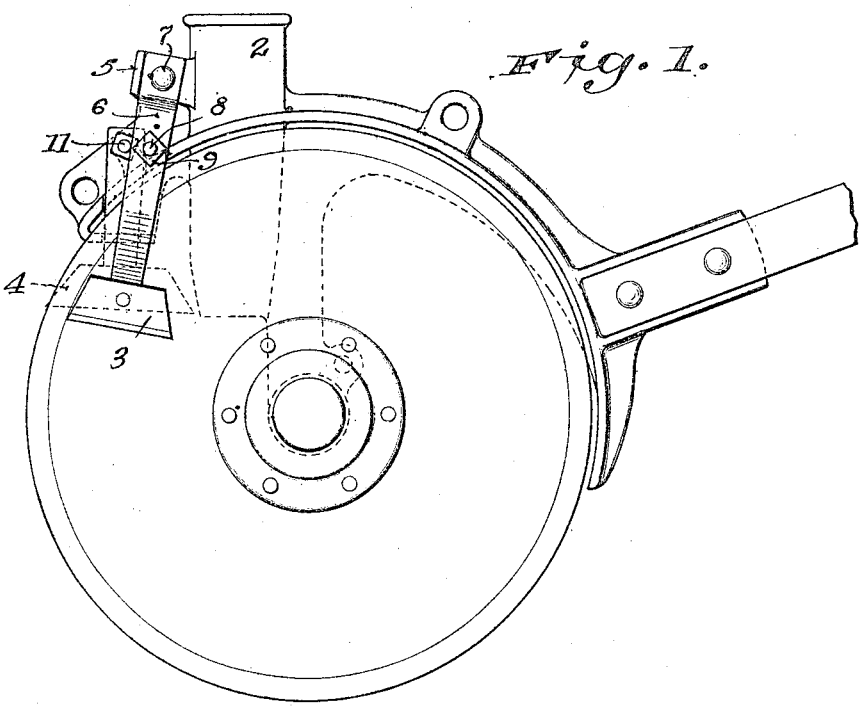
Figure 2:
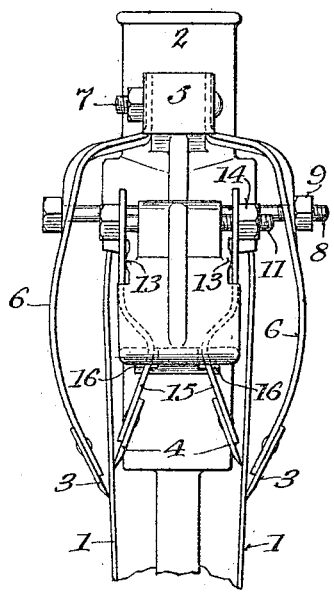
Figure 3:
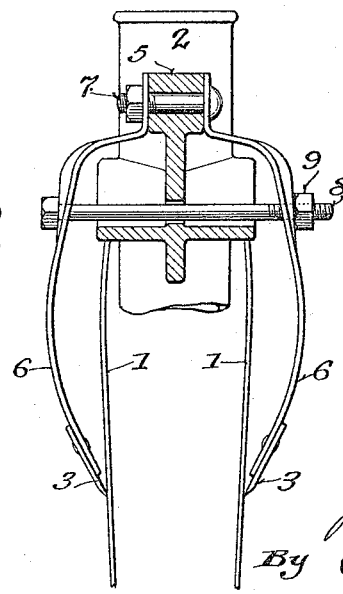
Figure 4:
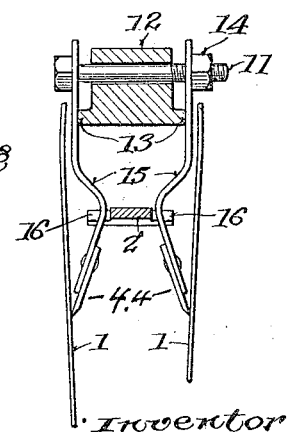

Figure 1 represents a side view of one of the disks of a seeder provided with my scraper, the so-called inside disk being indicated in dotted lines. Fig. 2 represents an edge view of a portion of a pair of converging disks showing the manner of attaching both the inside and outside scrapers to each of said disks. Fig. 3 is a similar view, partly in section, showing the device for attaching the outside scrapers only, and Fig. 4 also shows an edge view of a portion of a pair of disks and a vertical section of a portion of the supporting mechanism for supporting the inside scraper blades.

Like parts are identified by the same reference numerals throughout the several views.

1, 1 represent two converging disks.

2 is a seed duct.

3, 3 are outside scrapers, and 4, 4 are inside scrapers. The outside scrapers 3 are connected with the seed duct 2 through the laterally projecting shoulder 5 and resilient members 6, 6. The inside scrapers 4 are connected with the respective sides of the member 12 by the resilient members 15 and bolts 11. The bolt 8 is connected with the resilient members 6 at an intermediate point between the shoulder 5 and the scraping blades 3, and the pressure of the scraping blades against the respective outer sides of the disks 1 may be increased or diminished by turning the nut 9 forwardly or backwardly on said bolt 8. The members 6 are preferably made of elastic material so that said scraping blades 3 will bear with yielding pressure against the exterior surface of said disks 1. The inner scrapers 4 are connected with said feed duct 2 by the bolt 11 and laterally projecting shoulder 12. Fulcrum members 13 are located between said lateral projection 12 and said scraping blades 4, whereby as the nut 14 is turned forwardly on said bolt 11 the lower end of the resilient members 15 are thrown outwardly thereby increasing the tension or the force with which said scraping blades 4 are caused to bear against the inner surface of said disks 1. The fulcrum members 13 are formed integral or connected directly with the seed duct 2 in any convenient manner, and the member 2' is provided with recesses 16, 16 for the reception of said members 15, whereby said members 15 are securely retained in place. Thus, it will be obvious that as the nut 14 is turned in one direction said scraping blades 4 will be forced outwardly against the inner surface of said disks 1, while by turning said nut 14 in the opposite direction said scraping blades 4 will be caused to bear with a less pressure against the opposing surface of said disks. It will also be understood that the tension or the bearing pressure of the exterior scraping blade 3 may be readily increased or diminished by turning a single nut on the bolt 8, while the tension or bearing pressure of the inner scraping blades 4 may also be increased or diminished by turning a single nut on the bolt 11.

It will also be understood that a yielding pressure is applied to both pairs of scraping blades by using the resilient members 6 and 15.

Having thus described my invention what I claim as new and desire to secure by Letters Patent, is:—

In a device of the described class, the combination of two converging disks, a support located between said disks, lugs projecting laterally from the side of said support a resilient member connected with each side of each of said lugs, a scraping blade connected with the free end of each of said resilient members, and a bolt adjustably connecting each pair of said resilient members, whereby as the nuts on said bolts are turned forwardly or backwardly said scraping blades are caused to bear with greater or less pressure against said disks.

In testimony whereof I affix my signature in the presence of two witnesses.

JOSEPH P. OFFERMAN.

Witnesses:
A. W. LUECK,
W. W. KOCH.